United States Patent [19]
Kalb et al.

[11] Patent Number: 6,100,713
[45] Date of Patent: *Aug. 8, 2000

[54] TERMINATION CIRCUITS AND METHODS FOR MEMORY BUSES AND DEVICES

[75] Inventors: Jeffrey C. Kalb, Saratoga; John Jorgensen, Los Gatos, both of Calif.; Jeffrey C. Kalb, Jr., Phoenix, Ariz.; Dominick Richiuso, Saratoga, Calif.

[73] Assignee: California Micro Devices Corporation, Milpitas, Calif.

[ * ] Notice: This patent is subject to a terminal disclaimer.

[21] Appl. No.: 09/433,522

[22] Filed: Nov. 3, 1999

Related U.S. Application Data

[63] Continuation of application No. 09/074,525, May 7, 1998, Pat. No. 6,008,665.
[60] Provisional application No. 60/046,331, May 7, 1997.
[51] Int. Cl.[7] .................... H03K 19/003; H03K 19/0175
[52] U.S. Cl. ............................. 326/30; 326/58; 326/86; 326/90; 327/321
[58] Field of Search ................... 326/30, 56–58, 326/83, 86, 89, 90; 327/318, 321, 328

[56] References Cited

U.S. PATENT DOCUMENTS

| | | | |
|---|---|---|---|
| 3,937,988 | 2/1976 | DeClue et al. | 327/321 |
| 5,021,684 | 6/1991 | Ahuja et al. | 326/27 |
| 5,179,229 | 1/1993 | Tipon | 326/86 |
| 5,206,544 | 4/1993 | Chen et al. | 326/30 |
| 5,214,320 | 5/1993 | Truong | 326/30 |
| 5,528,190 | 6/1996 | Honningford | 327/328 |
| 5,760,601 | 6/1998 | Frankeny | 326/30 |

*Primary Examiner*—Michael Tokar
*Assistant Examiner*—Daniel D. Chang
*Attorney, Agent, or Firm*—Beyer, Weaver & Thomas, LLP.

[57] ABSTRACT

An active termination circuit for terminating a transmission line in memory bus, which might include a plurality of devices. The active termination circuit is configured to clamp a voltage level on the transmission line to one of a first reference voltage level and a second reference voltage level. The active termination circuit includes a first clamping transistor coupled to a transmission line terminal and a first terminal. The transmission line terminal is configured to be coupled to the transmission line in the electronic device. The first terminal is configured to be coupled to the first reference voltage level in the electronic device. There is included a second clamping transistor coupled to the transmission line terminal and a second terminal. The second terminal is configured to be coupled to the second reference voltage level in the electronic device. There is also included a first threshold reference device coupled to the first clamping transistor. The first threshold reference device being configured to maintain a base of the first clamping transistor at about $V_{BE}$ lower than the second reference voltage level. There is further included a second threshold reference device coupled to the second clamping transistor, the second threshold reference device being configured to maintain a base of the second clamping transistor at about $V_{BE}$ higher than the first reference voltage level.

16 Claims, 10 Drawing Sheets

TERMINATION CIRCUITS AND METHODS FOR MEMORY BUSES AND DEVICES

This application is a continuation of U.S. patent application Ser. No. 09/074,525 (Attorney Docket No. CMD1P006), filed May 7, 1998, now U.S. Pat. No. 6,008,665 entitled "Improved Termination Circuits and Methods Therefor," by inventors Jeffrey C. Kalb, John Jorgensen, Jeffrey C. Kalb Jr., and Dominick Richiuso, which is hereby incorporated by reference, and which claims priority under 35 U.S.C 119 (e) of a Provisional Application No. 60/046,331, filed May 7, 1997, and entitled "Improved Termination Circuits and Methods Therefor."

BACKGROUND OF THE INVENTION

The present invention relates to termination circuits and methods therefor. More particularly, the present invention relates to termination circuits that advantageously provides fast and efficient clamping for signals transmitted via transmission lines in electronic systems.

In the design and implementation of electronic systems (such as digital computers, consumer/commercial electronic devices, or the like), particularly those employing integrated circuits, undesired transmission line effects are of a particular concern. As signals travels down transmission lines, e.g., traces on a printed circuit board, reflections may occur on the lines. The reflections are due to, for example, mismatched impedances between the driver circuit and the line, which may cause the signal to reflect back and forth, giving rise to ringing. These reflections and other undesired transmission lines effect are often exacerbated as the operating speed of the signal increases. If left uncorrected, the reflections may cause the signal's voltage to swing outside of the defined "0" or "1" voltage levels, thereby causing the receiving device to incorrectly interpret the signal received and generate erroneous results.

Figure 1A:
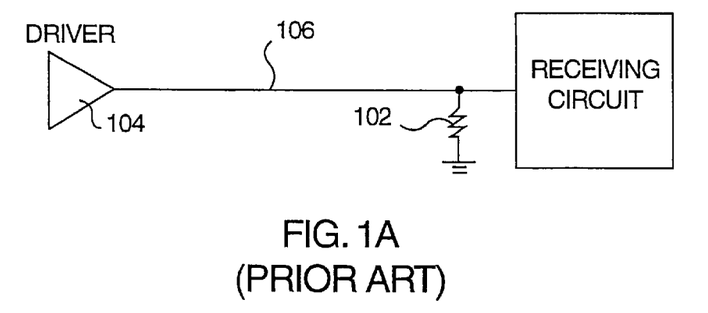
FIGS. 1A and 1B illustrate in general detail various prior art resistor-terminated approaches for clamping signals.

To address the impedance mismatch between the driver (or receiver) circuit and the transmission line, a variety of techniques have been tried in the prior art. FIG. 1A illustrates a resistor-terminated approach wherein a resistor 102 is inserted between the end of the transmission line and ground or alternately to the power supply. Resistor 102, whose value is chosen to provide impedance matching to the transmission line 106 so as to avoid reflections, thereby preventing the voltage on transmission line 106 to swing outside of the signal's defined operating ranges.

Figure 1B:
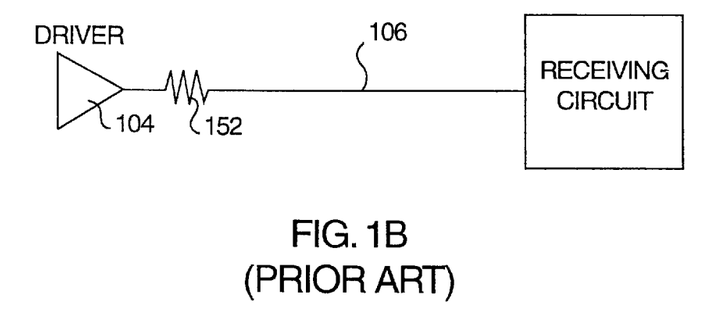

FIG. 1B illustrates an alternative series resistor-terminated approach wherein impedance matching resistor 152 is inserted between driver circuit 104 and transmission line 106. Impedance matching resistor 152 provides impedance matching to transmission line 106. This system relies on a half voltage signal propagating down the line, being double in magnitude and propagating back to the driving end, at which point it sees a properly terminated line and stabilizes.

While the resistor-terminated approach proves suitable for some systems, there are disadvantages. For example, the use of an impedance matching resistor attenuates the signal, which lowers noise immunity while dramatically increasing power dissipation. To illustrate, the presence of resistor 102 forms essentially a resistor divider circuit between the characteristic impedance of line 106 and resistor 102, thereby lowering the signal's voltage level at the receiving circuit.

Further, the presence of resistor 102 increases the power dissipation, which increases the load on the driver circuit and causes additional heat to be generated as well as more power from the system's supply. The presence of resistor 152 in FIG. 1B creates a situation in which the input to any other device which might be connected to the transmission line sits at half amplitude, an undesirable condition while the line is settling. Still further, it is often difficult to provide impedance matching for transmission lines whose characteristic impedance may change with the system's configuration. By way of example, transmission lines coupling with a computer's memory system may terminate at a plurality of memory slots. Depending on the amount of memory provisioned, some or all of these slots may be occupied. As can be appreciated from the foregoing, the characteristic impedance of these transmission lines may depend on the number of memory slots occupied. The variable impedance of these transmission lines makes it difficult to address impedance matching using resistors.

Figure 2:
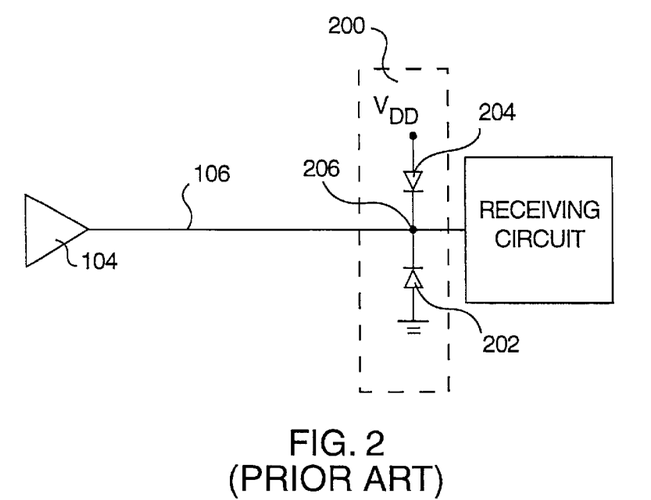
FIG. 2 illustrates a simplified prior art diode-terminated approach for clamping signals.

Diode-terminated matching circuits represent another approach to minimizing reflections on transmission lines. FIG. 2 illustrates a simplified diode terminated matching circuit 200, comprising diodes 202 and 204. As shown in FIG. 2, diode 202 is coupled between common terminal 206 and one rail voltage (ground in this case). Diode 204 is coupled between common terminal 206 and the other rail voltage ($V_{DD}$ in this case). As the signal travels down line 106, reflections increase the voltage thereon, causing the diodes to turn on to clamp the voltage on line 106 at the prescribed clamping voltages. In the case of FIG. 2, the clamping voltages are $V_{DD}+V_{TD}$ and ground $-V_{TD}$ wherein $V_{TD}$ represents the forward drop voltage of the diode. To ensure quick turn off of the diodes when the line's voltage is within the prescribed clamping voltages, Schottky diodes are typically employed.

In the diode-terminated approach, impedance matching is not critical. Accordingly, the diode-terminated approach is more suitable for transmission lines whose characteristic impedance may be variable. It is believed that such approaches have been in common use since the late 1960's. As the operating voltages of electronic devices decrease, however, diode-terminated clamping circuits prove inadequate. By way of example, it is contemplated that microprocessors or memory circuit employing 0.1 micron technology may operate with operating voltages as low as 1 volt. Since the forward drop voltage of a Schottky diode is typically around 0.6 V, the diode-terminated clamping circuit will not start to clamp until the voltage on the transmission line swings above 1.6 V ($V_{DD}$+VTD) or below −0.6 V ($-V_{TD}$). In other words, the voltage on the transmission line may vary by up to 60% before clamping begins. Such a wide disparity between the clamp voltage and the operating voltage makes this application of diodes ineffective.

Although manufacturers of electronic systems have long desired an easy-to-implement termination circuit design that can provide efficient clamping for modem high speed, low voltage signals, most of the attempts have been in the direction of improving the diode-terminated approach (e.g., by attempting to reduce the forward bias voltage of the diodes in the diode-terminated solution) or the resistor-terminated approach. This is because the task of addressing impedance mismatches at the board level is typically assigned to VLSI digital engineers, who have more familiarity with digital systems techniques than the complexities of analog line terminations. If analog engineers are assigned to the task, they typically have more familiarity with analog circuitry, e.g., diodes/resistors, than with VLSI design principles. By way of example, when the diode drops are too high, the engineers typically turn to tuning the termination system with resistors. In doing so, they increase power dissipation or in other ways impact system performance as indicated above.

With current fabrication technology, a reliable zero voltage forward bias diode has not been found. Accordingly, current diode-terminated designs continue to prove unsuitable for use with modem low voltage circuits. Moreover, even if such a diode could be obtained, the diode-terminated clamping circuit (as well as the resistor-terminated clamping circuit for that matter) cannot be easily integrated into modern CMOS (complementary metal oxide semiconductor) receiving or driving circuits, such as microprocessor or memory circuits. Typically, these approaches require that the termination circuit be implemented as a separate, stand-alone chip. For designs that are form-factor limited, e.g., small or portable electronic systems, this requirement is highly disadvantageous since it requires additional space on the circuit board and increases costs.

In view of the foregoing, there are desired improved termination circuits and methods therefor that advantageously provide fast and efficient clamping for signals transmitted via transmission lines in electronic systems, particularly signals having low operating voltage ranges.

SUMMARY OF THE INVENTION

The present invention relates, in one embodiment, to an active termination circuit for terminating a transmission line in an electronic device. The active termination circuit is configured to clamp a voltage level on the transmission line to one of a first reference voltage level and a second reference voltage level. The active termination circuit includes a first clamping transistor coupled to a transmission line terminal and a first terminal. The transmission line terminal is configured to be coupled to the transmission line in the electronic device. The first terminal is configured to be coupled to the first reference voltage level in the electronic device. There is included a second clamping transistor coupled to the transmission line terminal and a second terminal. The second terminal is configured to be coupled to the second reference voltage level in the electronic device. There is also included a first threshold reference device coupled to the first clamping transistor. The first threshold reference device being configured to maintain a base of the first clamping transistor at about $V_{BE}$ lower than the second reference voltage level. There is further included a second threshold reference device coupled to the second clamping transistor, the second threshold reference device being configured to maintain a base of the second clamping transistor at about $V_{BE}$ higher than the first reference voltage level.

In another embodiment, the invention relates to an active termination circuit for terminating a signal traversing on a transmission line of a circuit board. The termination circuit includes a bottom clamping transistor coupled to ground. The termination circuit further includes a bottom threshold reference transistor coupled to the gate of the bottom clamping transistor for biasing the gate of the bottom clamping transistor at about a first threshold voltage above ground. The first threshold voltage represents a threshold voltage of the bottom threshold reference transistor. The bottom clamping transistor is arranged for clamping the signal at about ground. The termination circuit further includes a top clamping transistor coupled to $V_{DD}$. The termination circuit further includes a top threshold reference transistor coupled to the gate of the top clamping transistor for biasing the gate of the top clamping transistor at about a second threshold voltage below the $V_{DD}$. The second threshold voltage represents a threshold voltage of the top threshold reference transistor. The top clamping transistor is arranged for clamping the signal at about the $V_{DD}$.

These and other advantages of the present invention will become apparent upon reading the following detailed descriptions and studying the various figures of the drawings.

BRIEF DESCRIPTION OF THE DRAWINGS

To facilitate comparison.

DETAILED DESCRIPTION OF THE INVENTION

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

In accordance with one embodiment of the present invention, there are provided improved active termination circuits for clamping signals traversing transmission lines of an electronic system. The improved active termination circuits advantageously employ active devices, e.g., transistors, for clamping signals while facilitating high speed operation and low power consumption. Unlike prior art diode-terminated clamping circuits, the improved active termination circuits are arranged to provide satisfactory clamping at or substantially at the rail voltages of the signal, thereby simulating the effect of a zero threshold diode and rendering them suitable for use with the low voltage signals of modern electronic devices while retaining compatibility with higher voltage devices as well.

Figure 3:
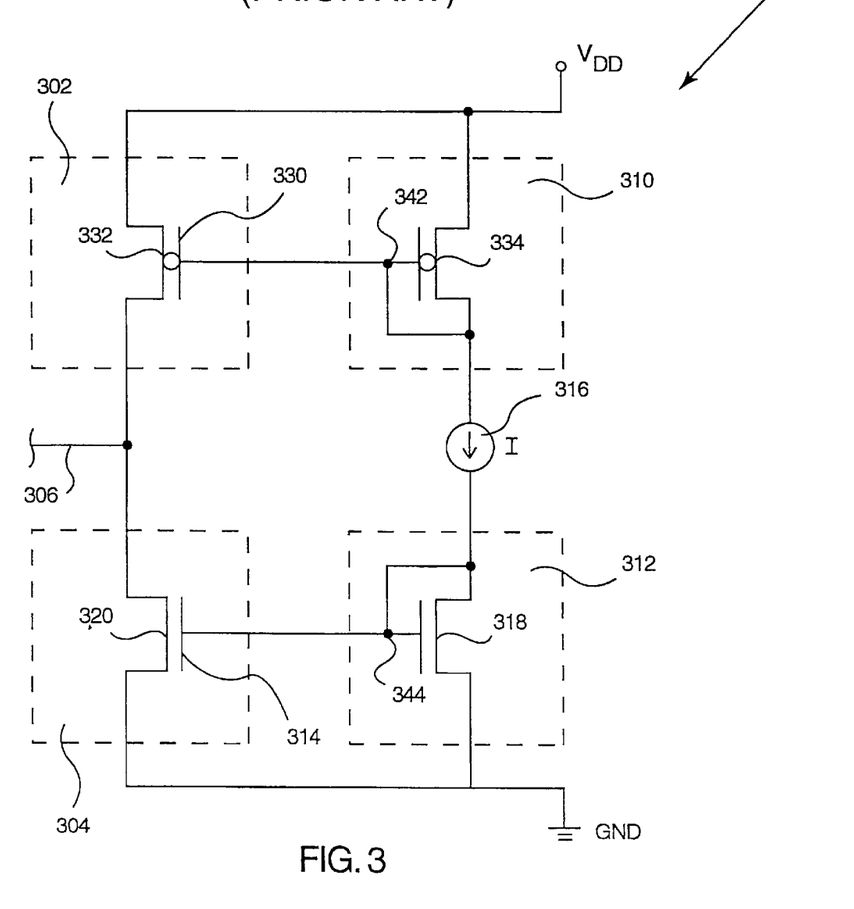
FIG. 3 illustrates, in accordance with one embodiment of the present invention, a CMOS implementation of the inventive active termination circuit.

To further discuss the advantages and features of the invention, FIG. 3 illustrates, in accordance with one embodiment of the present invention, the inventive termination circuit 300 for terminating signals traversing transmission lines of electronic systems. As show in FIG. 3, termination circuit 300 includes a top active clamping device 302 and a bottom active clamping device 304. In the embodiment of FIG. 3, top active clamping device 302 is implemented by a p-channel MOS device 332 and serves to clamp the signal on a transmission line 306 at about the upper rail voltage (e.g., $V_{DD}$). On the other hand, bottom active clamping device 304 is implemented by an n-channel MOS device 320 and serves to clamp the signal on transmission line 306 at the lower rail voltage (e.g., ground or GND). In accordance with the convention utilized herein, the top devices are employed to clamp the voltage level of the signal on the transmission line at its upper range (e.g., to about $V_{DD}$), while the bottom devices are employed to clamp the voltage level of the signal at its lower range (e.g., to about ground).

The source of MOS device 332 is coupled to $V_{DD}$ while the source of MOS device 320 is coupled to ground. The drains of devices 332 and 320 are both coupled to transmission line 306 as shown. Referring now to bottom active clamping device 304, a gate 314 of MOS device 320 is coupled to both the gate and drain of a bottom threshold reference device 312. As shown in FIG. 3, bottom threshold reference device 312 includes a n-channel MOS device 318, which is arranged in a gate-to-drain connected configuration.

When sufficient current flows into the drain of n-channel MOS device 318 (the current may be sourced from any conventional current sourcing arrangement, which is shown symbolically by current source 316 in FIG. 3), gate 314 of bottom active clamping device 304 is biased at about one threshold voltage $V_T$ of n-channel MOS device 318 above ground. Typically, the voltage at gate 314 is biased at the threshold voltage $V_T$ of n-channel MOS device 318 plus a small amount of overdrive voltage necessary to sustain the current through device 318.

When the signal on transmission line 306 begins to reflect and dips below ground, i.e., as soon as the potential difference between the gate of n-channel MOS device 320 of bottom active clamping device 304 and its source exceeds $V_T$, n-channel device 320 begins to conduct to source current from its drain, which is connected to ground as shown in FIG. 3. Accordingly, the signal is clamped at about or slightly below ground. As noted, gate 314 of n-channel device 320 is typically biased slightly above $V_T$. Consequently, it is typically the case that n-channel device 320 begins to conduct when the signal on transmission line 306 is slightly above ground (e.g., perhaps 0.1 V above ground). In this manner, n-channel device 320 would be in full conduction when the signal on transmission line 306 dips below ground.

Since both n-channel device 318 and n-channel device 320 may be fabricated on the same die, their threshold voltages $V_T$ will be substantially equal irrespective of process variation. Therefore, n-channel device 320, which has its gate potential biased by $V_T$ of n-channel device 318, can readily turn on as soon as the signal on transmission line 306 drops below ground (or even near ground).

A similar arrangement exists with reference to gate 330 of the p-channel MOS device 332 of top active clamping device 302. Gate 330 is coupled to the gate and drain of p-channel MOS device 334. The source of p-channel MOS device 330 is coupled to $V_{DD}$ as shown. When sufficient current flows into the drain of p-channel device 334, gate 330 of p-channel device 332 is biased at about $V_{DD}-V_T$, where $V_T$ is the threshold voltage of p-channel MOS device 334. Actually, gate 330 of p-channel device 332 is biased slightly below this value ($V_{DD}-V_T$) due to the presence of the overdrive voltage necessary to sustain current through p-channel MOS device 334.

When the signal on transmission line 306 begins to reflect and rises above $V_{DD}$, p-channel MOS device 332 turns on to clamp this signal at about $V_{DD}$. Due to the presence of the aforementioned overdrive voltage, p-channel MOS device 332 typically turns on slightly before the voltage level of the signal on transmission line 306 reaches $V_{DD}$, thereby ensuring that p-channel MOS device 302 is fully turned on when the signal's voltage level exceeds $V_{DD}$. Again, the fact that both p-channel devices 332 and 334 may be fabricated on the same die ensures that their threshold voltages $V_T$ are substantially equal irrespective of process variations.

P-channel MOS device 332 and N-channel MOS device 320 are preferably sized such that their clamp impedance when they are turned on is substantially lower than the characteristic impedance of transmission line 306 (e.g., lower than about 50 Ω in one embodiment). In some cases, the drain-to-gate parasitic capacitance of n-channel device 320 may cause the voltage on gate 314 to vary as the voltage level of the signal on transmission line 306 changes (the impedance at node 344 looking into n-channel MOS device 318 is typically quite high since little current flows through n-channel MOS device 318). In these cases, it may be advantageous to stabilize the voltage level at gate 314 of n-channel MOS device 320 using an appropriate voltage stabilizing circuit.

In one embodiment, it is contemplated that node 344 may be coupled to an internal or external capacitor of an appropriate size (e.g., about 10× the drain-to-gate parasitic capacitance). Note that a similar issue also exists with respect to node 342, and it may be advantageous to provide node 342 with a similar voltage stabilizing circuit to ensure that p-channel MOS device 332 turns on reliably when the voltage level of the signal on transmission line 306 attempts to jump the $V_{DD}$ rail.

As can be appreciated by those skilled in the art, termination circuit 300 advantageously clamps the voltage on the terminated transmission line to the rail voltages as soon as the signal's voltage attempts to exceed the rails. Due to the use of the threshold reference devices (devices 310 and 312), top active clamping device 302 and bottom active clamping device 304 act as "zero-threshold" transistors, i.e., they clamp as soon as the signal's voltage exceed $V_{DD}$ and ground. This is a substantial advantage over prior art diode-terminated approaches, which cannot begin to clamp until the signal's voltage exceed the rails by the forward drop voltage of the electrodes (e.g., by about 0.6 V typically). As such, the inventive active termination circuit is highly suitable for use with modern low voltage signals.

The termination circuit of FIG. 3 may be fabricated in an external termination component (e.g., by putting a plurality of termination circuits 300 on a separate chip for use with existing receiver/driver circuits). Equally advantageously, termination circuit 300 may readily be incorporated into the CMOS receiver or driver circuit, e.g., the CMOS microprocessor or CMOS memory devices. The ease with which termination circuit 300 can be integrated into CMOS receiver or driver circuits using conventional VLSI design methodologies solves a long-felt need in the industry since it facilitates signal termination while requiring few, if any, additional processing step in the fabrication of the CMOS receiver or driver circuit. The ability to integrate the termination circuit right into existing receiver or driver circuits eliminates the need for external termination component, thereby saving space on the circuit board, which is a significant concern for designers of small form-factor electronic systems (e.g., portable computers, portable electronic devices, and the like.

Further, termination circuit 300 dissipates substantially less power compared to either the resistor-terminated solution of FIGS. 1A and 1B. Although p-channel device 334 and n-channel device 318 of the threshold reference devices stay on at all times, these devices may be arranged to conduct very little current (e.g., 1 to 2 mA, which is typically a factor of 20 less than that consumed in FIG. 1A) since they only have to conduct enough current to sustain the threshold voltage at gates 330 and 314. When MOS devices 332 and 320 of the clamping devices turn on (i.e., when the voltage level of the signal on transmission line 306 exceeds the rail voltages), the low clamping voltage minimizes power consumption. These features make termination circuit 300 particularly suitable for use in battery-operated electronic systems.

Additionally, it should be appreciated that the use of active devices in termination circuit 300 facilitate fast clamping. Since clamping occurs as soon as the voltage level on transmission line 306 exceeds the rail voltages (or even slightly before) and is essentially independent of the characteristic impedance of the transmission line, termination circuit 300 is essentially self-tuning. Accordingly, termination circuit 300 is highly suitable for use in terminating transmission lines whose characteristic impedance may change depending on the configuration of the electronic system (e.g., data lines leading to memory banks).

Figure 4:
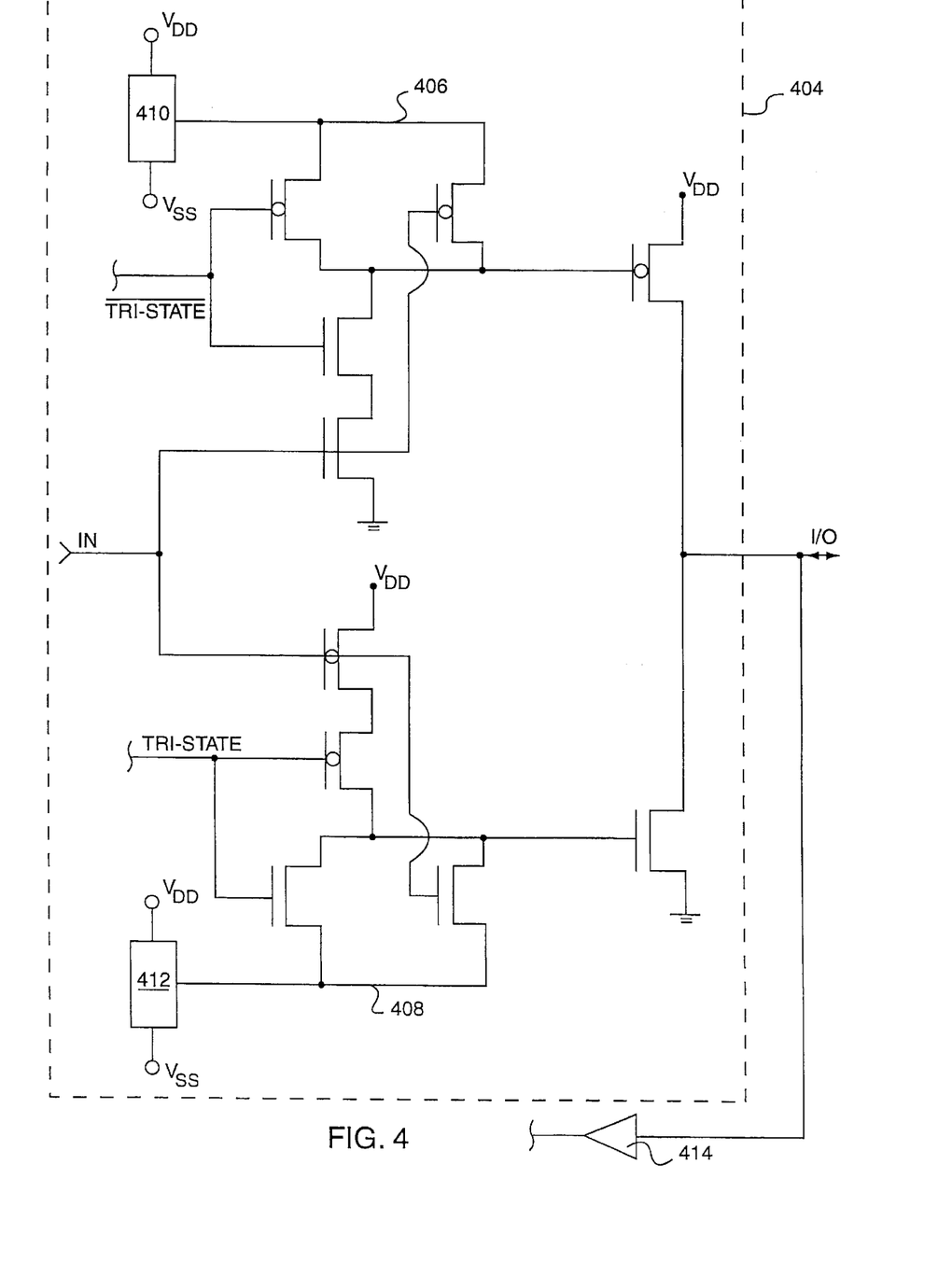
FIG. 4 illustrates, in accordance with one embodiment of the present invention, a CMOS implementation of the inventive termination circuit for tri-stated signals.

The active termination embodiment proposed in FIG. 3 is particularly suitable for use with CMOS tri-state circuits. As one example, FIG. 4 illustrates one such implementation having an output driver 404, an input receiver 414, and tri-state control signals. If node 406 is coupled to a bias voltage of about $V_{DD}-V_T$ (as generated by voltage reference block 410) instead of $V_{DD}$, and node 408 is coupled to a bias voltage of about $+V_T$ (as generated by voltage reference block 412) instead of ground, tri-state circuit 416 can also serve as a termination circuit to clamp the voltage level of the signal on transmission line 402 when the control signals place tri-state circuit 416 in the "tri-state" mode.

It should be noted, by way of example, that node 342 of top threshold reference device 310 of FIG. 3 may be used as the reference voltage for node 406 of FIG. 4. Similarly, other embodiments of voltage reference circuit 410 may be used to supply a bias voltage to node 406 of FIG. 4. In the same manner, node 344 of bottom threshold reference device 312 of FIG. 3 may be used as the reference voltage for node 408 of FIG. 4. Similarly, other embodiments of voltage reference circuit 412 may be used to supply a bias voltage to node 408 of FIG. 4. Although FIG. 4 shows one particular implementation of the active termination tri-state circuit, one of ordinary skill in the art will appreciate that the technique disclosed herein is also applicable to other tri-state designs.

It should also be noted that the above-mentioned techniques are equally applicable for drivers which are nontri-state. It should be appreciated that such a circuit as described in FIG. 4, or analogous circuits, may be easily integrated into existing CMOS I/O circuits, thereby permitting the driver circuit to furnish both the driver (tri-state or nontri-state) function and the termination function in the same process with minimal design changes and/or minimal additional space on the die.

Figure 5:
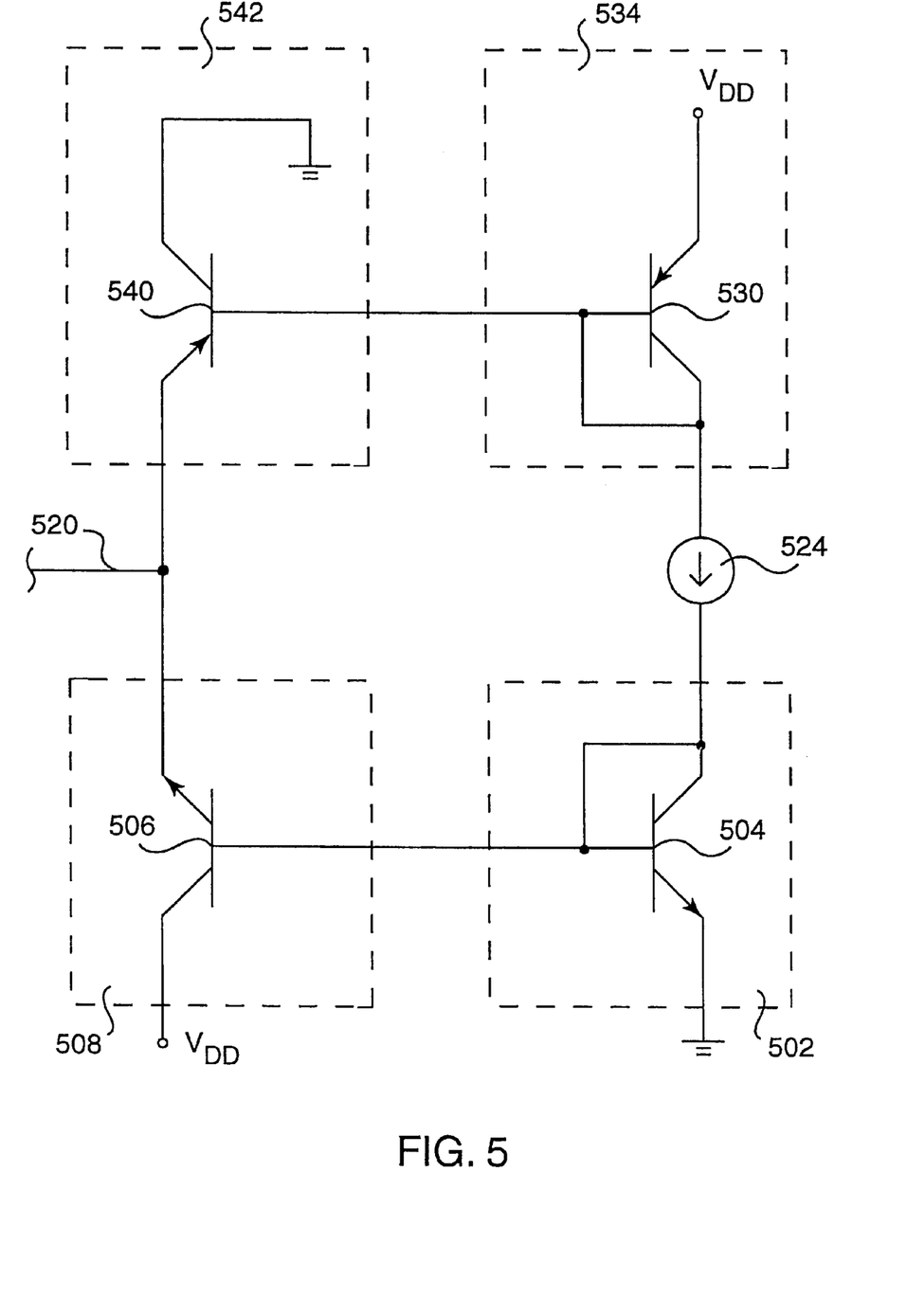
FIG. 5 illustrates, in accordance with one embodiment of the present invention, a bipolar implementation of the inventive active termination circuit.

FIG. 5 illustrates, in accordance with one embodiment of the present invention, a bipolar implementation of the inventive active termination circuit. The operating principle behind the termination circuit of FIG. 5 is analogous to the operating principle behind the termination circuit of FIG. 3, with the exception that the top and bottom clamping devices of FIG. 5, as well as the top and bottom threshold reference devices, have been implemented using bipolar technology. Bipolar technology allows the termination circuit to be readily integrated into a bipolar receiver/driver circuit (although stand-alone implementation is certainly possible to permit the termination circuit of FIG. 5 to work with existing electronic devices). Further, bipolar technology may have some advantages, e.g., higher speed and smaller size, among others. Additionally, the bipolar termination may, in some cases, have an even lower effective impedance than the CMOS implementation.

Referring now to FIG. 5, there is shown a bottom threshold setting device 502, which includes an n-p-n transistor 504. Transistor 504, which is arranged in a collector-to-base connected configuration, has its emitter coupled to ground and its base coupled to the base of n-p-n transistor 506 of bottom clamping device 508. The function of bottom threshold device 502 is to furnish a voltage of about $+V_{BE}$ above ground to the base of n-p-n transistor 506 when a sufficient amount of current flows through n-p-n transistor 504 (the current is sourced into the collector of n-p-n transistor 504 using a conventional transistor sourcing arrangement, which is represented symbolically in FIG. 5 by current source 524).

When the voltage level on a transmission line 520 goes slightly below ground, n-p-n transistor 506 starts to conduct, thereby clamping the voltage at about ground. Again, the presence of a small overdrive voltage to sustain conduction in transistor 504 may cause the base of n-p-n transistor 506 to be biased at slightly above $+V_{BE}$, causing n-p-n transistor 506 to turn on slightly before the signal's voltage reaches ground. In this manner, it is ensured that transistor 506 is fully turned on when the signal's voltage dips below ground.

Note that the collector of n-p-n transistor 506 is advantageously coupled to $V_{DD}$ instead of to ground to ensure that transistor 506 is substantially off until clamping commences. If the collector of transistor 506 was coupled to ground instead, the high β of this transistor would have caused a nontrivial amount of current to flow even when the voltage level of the signal on transmission line 520 is within the rails, thereby significantly increasing power consumption.

Collector-to-base connected p-n-p transistor 530 of top threshold device 534 biases the voltage at the base of p-n-p transistor 540 of top clamping device 542 at about $V_{DD}-V_{BE}$. As the signal's voltage on transmission line 520 exceeds $V_{DD}$ (or at slightly below $V_{DD}$ due to the presence of the overdrive voltage that sustains conduction in transistor 530), p-n-p transistor 540 turns on to clamp the voltage's level at about $V_{DD}$.

In some cases, the base-to-emitter parasitic capacitance of transistors 506 and 540 may require additional voltage stabilizing circuits to be coupled to the gates of these transistors to ensure that these transistors clamp reliably while the voltage level on transmission line 520 varies. Conventional voltage stabilizing approaches, including those discussed in connection with FIG. 3, may be employed for voltage stabilization.

It should be appreciated that the termination circuit of FIG. 5 has the same self-tuning, flexible implementation (separate or integrated into the driver/receiver circuit), and low clamping voltage features discussed earlier in connection with FIG. 3. However, power consumption for the termination circuit of FIG. 5 may be slightly higher than that of FIG. 3. This is because current is sourced from ground, i.e., from the collector end of p-n-p transistor 540 (instead of from $V_{DD}$ as in the case of FIG. 3), when the signal's voltage exceeds $V_{DD}$. The higher voltage across transistor 540 when it conducts occurs may lead to increased power consumption. Similarly, current is sourced from $V_{DD}$, i.e., from the collector end of n-p-n transistor 506 (instead of from ground as in the case of FIG. 3), when the signal's voltage exceeds ground. The higher voltage across transistor 506 when it conducts may also lead to increased power consumption.

Figure 6:
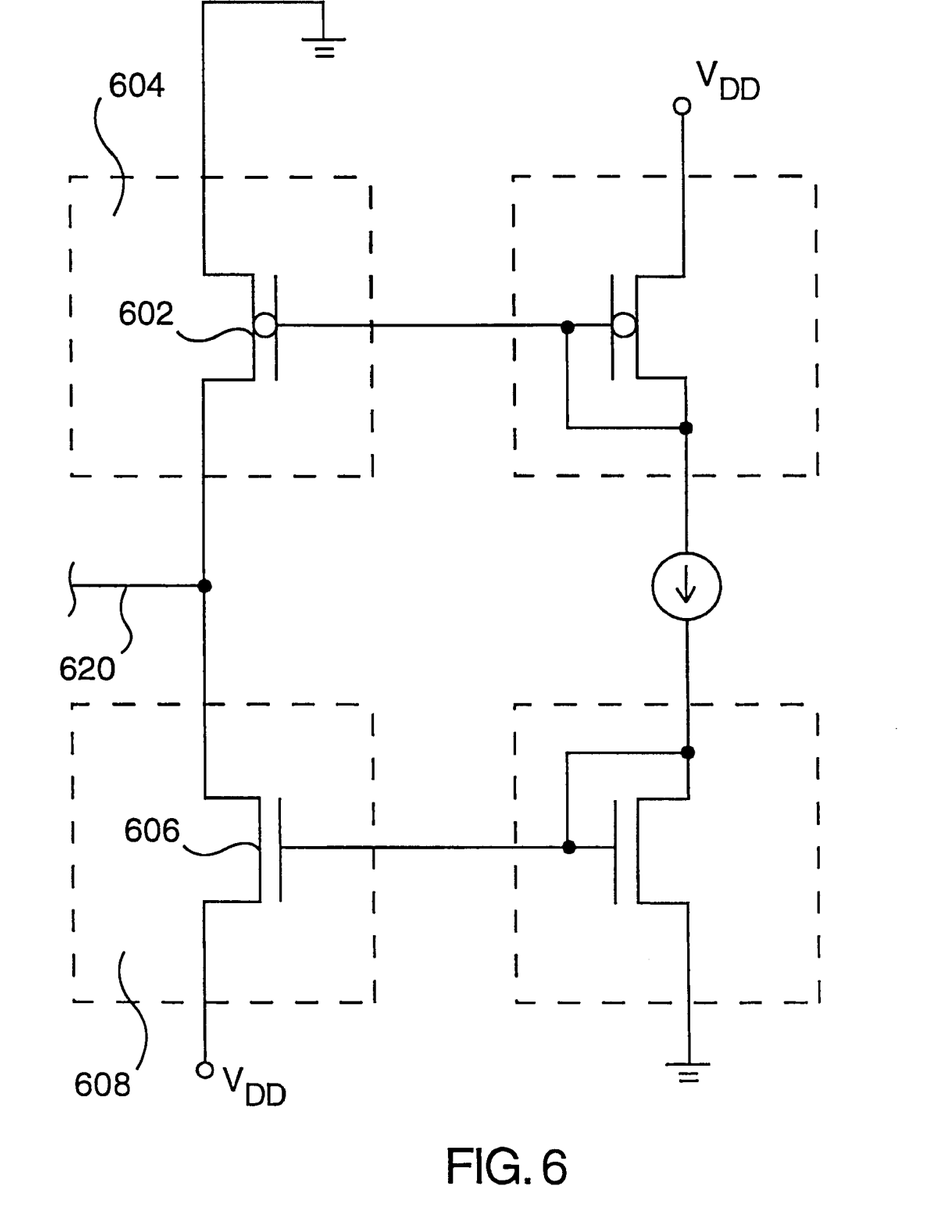
FIG. 6 illustrates, in accordance with one embodiment of the present invention, an alternative CMOS implementation of the inventive termination circuit.

FIG. 6 illustrates an alternative CMOS embodiment wherein a p-channel device 602 of a top clamping device 604 is coupled to ground (instead of $V_{DD}$ as in the case of FIG. 3). Conversely, an n-channel device 606 of a bottom clamping device 608 is coupled to $V_{DD}$ instead of to ground. The remainder of the termination circuit of FIG. 6 is substantially analogous to the remainder of the termination circuit of FIG. 3.

When the voltage level on transmission line 620 dips below ground (or approaches it due to the presence of the aforementioned overdrive voltage), the current that clamps the voltage to ground comes from $V_{DD}$ instead of ground (as in the case of FIG. 3). Conversely, when the voltage level on transmission line 620 exceeds $V_{DD}$ (or approaches it due to the presence of the aforementioned overdrive voltage), the current that clamps the voltage to $C_{DD}$ comes from ground instead of $C_{DD}$ (as in the case of FIG. 3). This arrangement, like that of FIG. 4, ensures that p-channel device 602 and n-channel device 606 more completely turn off when the voltage level on transmission line 620 is within the rails.

Additionally, there is a large voltage from drain to source across these transistors while clamping. The increased conduction permits these transistors to be sized smaller, thereby advantageously reducing area and capacitance, leading to increased speed. It should be appreciated that the termination circuit of FIG. 6 also has the same self-tuning, flexible implementation (separate or integrated into the driver/receiver circuit), and low clamping voltage features discussed earlier in connection with FIGS. 3 and 5. However, the larger voltage across the clamping transistors 602 and 606 during clamping may increase power consumption. As before, the aforementioned voltage stabilizing circuit may, in some cases, be coupled to the gates of transistors 602 and 606 to ensure that top clamping device 604 and bottom clamping device 608 clamp reliably even if the voltage level on transmission line 620 vary.

ADDITIONAL DISCUSSION, EXAMPLES AND APPLICATIONS

To more fully discuss the theories and applications of the present invention, the following discussion is included to supplement understanding. In particular, issues including impedance mismatches are discussed in greater detail to facilitate an understanding of the difficulties inherent in the prior art approaches and the advantages of the present invention.

In the design and implementation of electronic systems such as computers, consumer/commercial electronic devices, and the like, particularly those employing integrated circuits (ICs), the issue of transmission line termination is a major issue. When signals propagate down a transmission line and encounter impedance mismatches at the end of the line, they are reflected back and forth across the line causing what is normally described as ringing.

The typical response to this problem is to terminate the transmission lines with an impedance equal to the characteristic impedance of the lines. The problem with this is that such a system greatly increases the power dissipation of the system, increases the required drive capability of the circuits, causing problems for other devices that might be connected midway along the line, or a number of other issues depending on the solution chosen.

As a result, designers prefer logic systems which do not require such terminators. When TTL (Transistor-Transistor Logic) circuits were becoming popular, they did not use terminations but suffered from severe ringing and noise problems. It was almost impossible to build large systems.

Another approach is to employ TTL circuits which have clamp diodes at the inputs. While these diodes did not impact the termination impedance within the operating range of the device—and thus consumed no extra power, as soon as waveform at the input overshot or undershot the clamping voltages (typically rail voltages+/−the diode's forward drop voltage) the diode clamps would come into action, clamping the reflections, and keeping the operating signal within predefined levels. The fundamental concept underlying such a termination system is that one can use non-linear termination devices that provide proper termination outside of the normal operating range while retaining a high characteristic impedance within the operating range.

Figure 7:
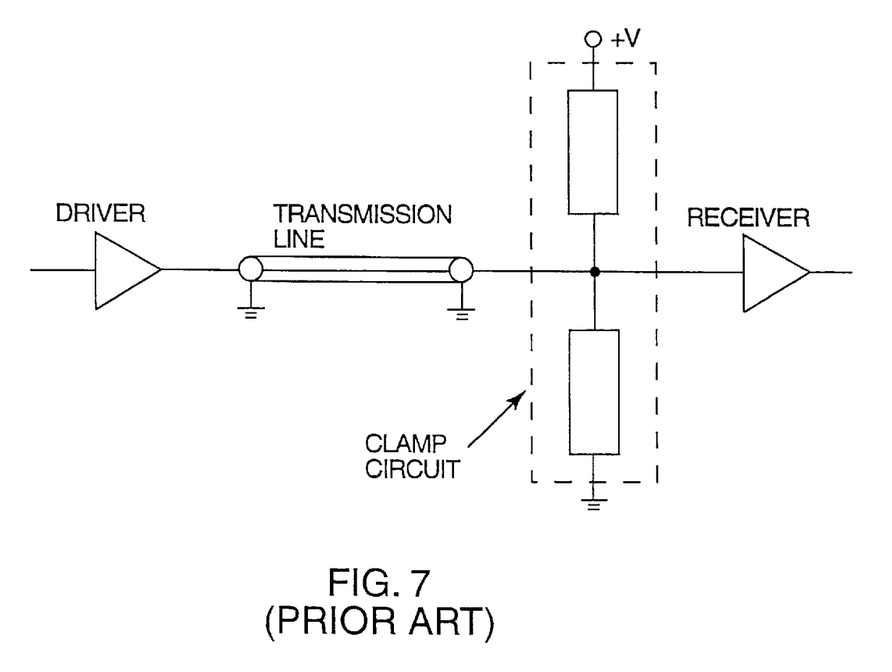
FIG. 7 illustrates a general circuit configuration having a driver circuit, a transmission line, a receiver circuit and a termination device associated therewith to facilitate discussion.

FIG. 7 below shows the general circuit configuration applicable to all of the following discussions. It shows a circuit driving a transmission line with a receiving device on the other end. The dotted box shows the application of a clamp or other form of termination at the receiving end.

Figure 8A:
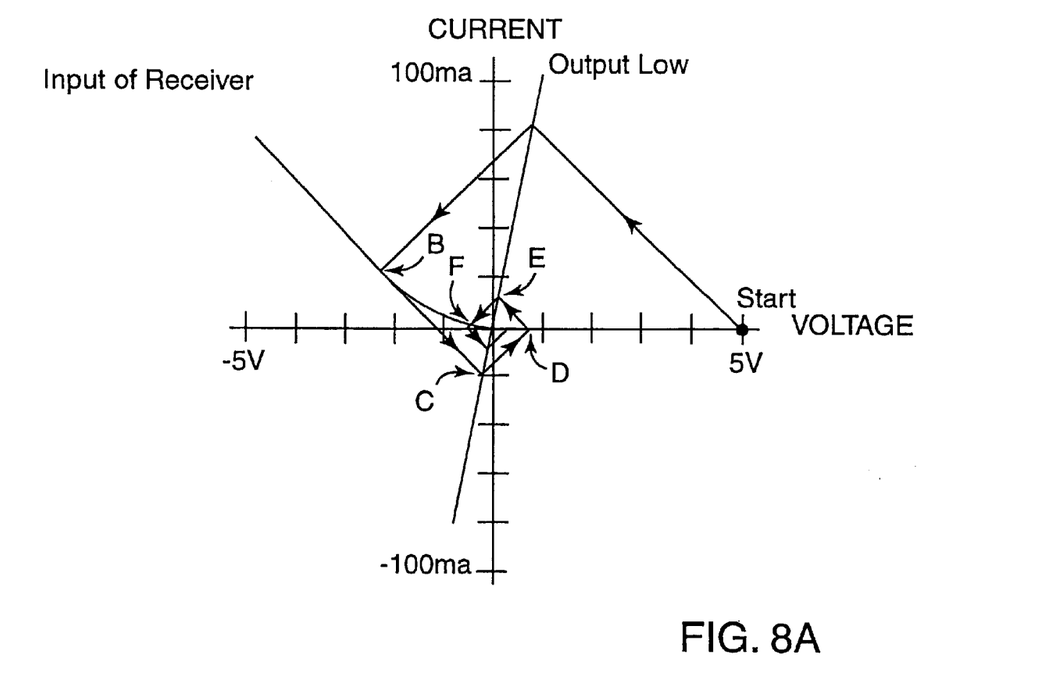
FIGS. 8A and 8B depict a voltage-current diagram and a voltage-time diagram, respectively, to facilitate discussion of the problems associated with transmission systems having no special diode clamping.
Figure 8B:
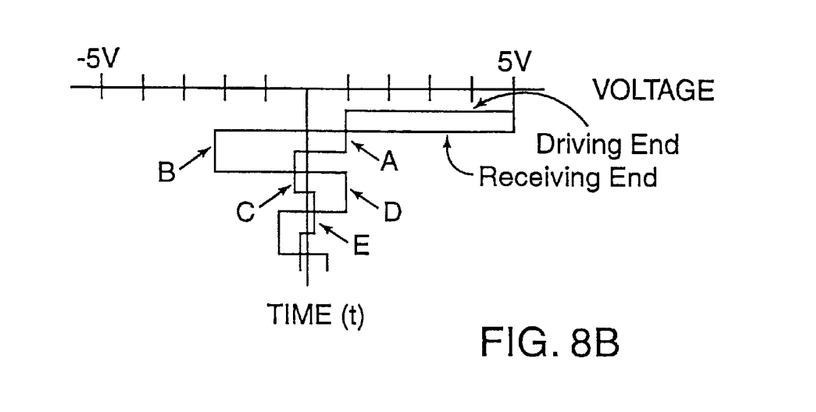

FIGS. 8A and 8B below illustrates the problems. It shows a traditional CMOS or TTL situation without special diode clamping. (Note that the analysis and discussion presented below related specifically to a falling waveform and the lower half of all the clamp circuits shown in this paper. But an analogous discussion could be had relative to a rising waveform and the upper half of the clamp circuit.)

FIG. 8A is a voltage-current diagram that describes what happens electrically on the transmission line. If a 50 Ohm transmission line is initially stabilized at 5V (right hand side of FIG. 8A labeled "Start") and the output of a driver turns on (Output low), the current waveform which will propagate down the line can be graphically derived by drawing a 50 Ohm impedance line from the "Start" point to intersect with the output impedance curve of the driver (point "A"). In this case, the output voltage initially pulls down to about 0.9V and approximately an 80 ma. current waveform is sent down the transmission line. In this discussion, current polarities are defined such that current flowing down the transmission line from the receiver to the driver is positive. Voltages are referenced to ground in a conventional manner.

That same transition can be viewed in FIG. 8B if the drawing is turned on its side. Each square along the "t" (time) axis represents one trip of a waveform down or back up the transmission line. So first the output voltage drops to the voltage of point "A" and then one transmission time later (one square), the receiving end begins to change.

The equilibrium point (balance between the waveform arriving at the receiving end and the load impedance) at the receiving end can be derived by drawing a −50 Ohm impedance line from point "A" to intersect with the impedance curve of the receiving gate. So at the receiving end, the driving end transition from 5 Volts to 0.9V will be seen as a transition from 5V to −2.5V (point "B"), causing another reflection which is sent back toward the driving end. Drawing another 50 Ohm transmission line to intersect once more with the driving end at point "C" shows that it is expected to see the output of the driver driven to about −0.3V with another current wave being send down the line to the receiving end. Each of these transitions is shown on the drawing of FIG. 8B at the appropriate time interval.

When the reflection from the output (point "C") gets back to the receiving end (point "D") a problem arises because the new reflection takes the receiving end up into 0.9V range (point "D"), exceeding the worst case noise level of the receiving device and possibly causing an erroneous signal. This can cause the receiving device to misinterpret the input voltage and generate erroneous data.

Figure 9:
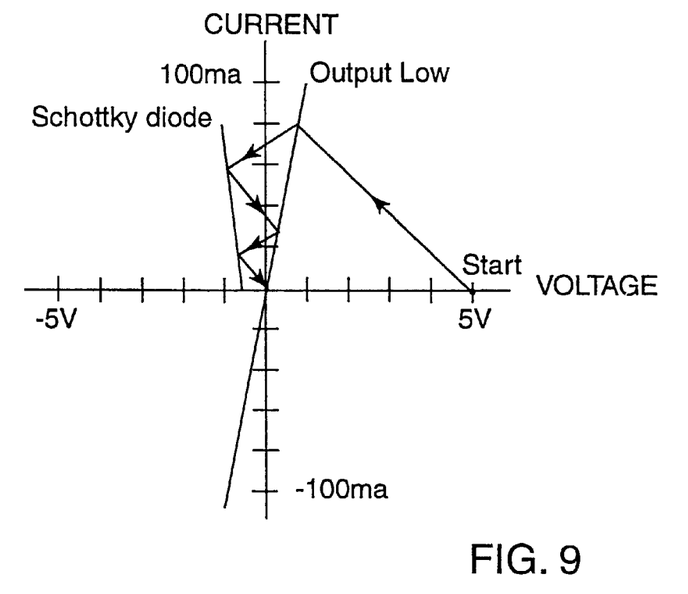
FIG. 9 is a voltage-current diagram showing the response of the transmission system when the input characteristics of the transmission system is supplemented with a Schottky diode device disposed in parallel.

Referring now to FIG. 9, the normal input characteristics of the receiving device have been supplemented by placing a Schottky diode in parallel with it. Notice that while the current waveform in the first transition is the same as in FIG. 8A, the clamping action of the diode changes the equilibrium point at the receiving end so that the input voltage does not go unduly negative, and hence the energy reflected back down the line is reduced. This ultimately leads to the situation where the receiving device never sees the damaging positive reflection of the previous example.

Figure 10:
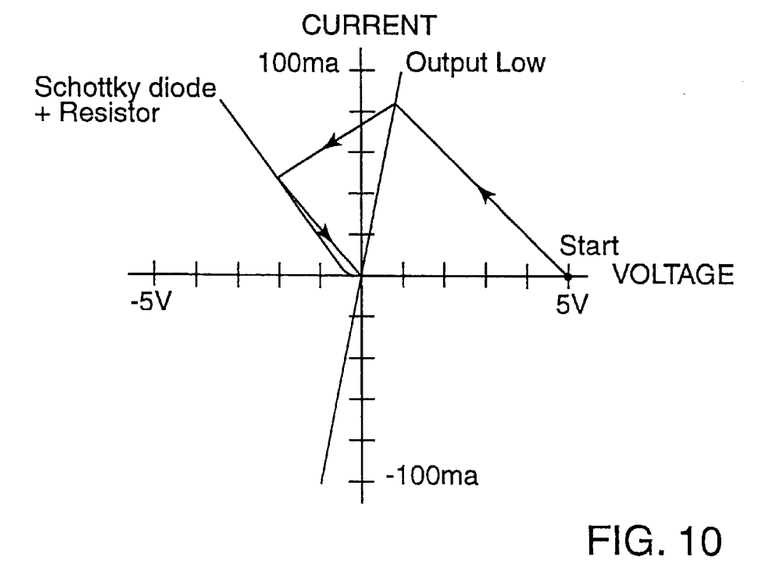
FIG. 10 is a voltage-current diagram showing the response of the transmission system of FIG. 9 when a resistor is inserted in series with the Schottky diode device.

FIG. 10 represents a special case of the situation in FIG. 9 in which a resistor is inserted in series with the Schottky diode. The resistor value is selected to be such that the equivalent impedance at the point of equilibrium is chosen to exactly match the 50 Ohm transmission line. In this situation, the current reflected back down the transmission line from the receiving end is exactly the amount necessary to settle the transmission line in one reflection.

Irrespective whether this approach is a practical alternative in a real life situation (which would require that the full characteristics of both the driver and transmission line be understood), it is realized from the above analysis that if the combined characteristic impedance of the devices on the receiving line outside of the operating range is greater than the transmission line impedance at the point of equilibrium, the system will sustain reflections that ultimately cause a positive reflection into the operating range of the device and possibly cause noise problems. On the other hand, if the combined characteristic impedance at the receiving end at the equilibrium point is lower than that of the transmission line, no positive reflections will result. Further, the closer the match between the transmission line and the termination at the point of equilibrium, the faster the system will settle.

There are, however, other issues to consider. First, the equilibrium point is a function of all the conditions that went before it, especially the initial starting voltage of the system. But perhaps more importantly, the effective impedance of the diode varies with current. And since the operating range of the Schottky diode below 0.5V shows an extremely high equivalent impedance, equilibrium points in that region will cause undesirable reflections.

Figure 11:
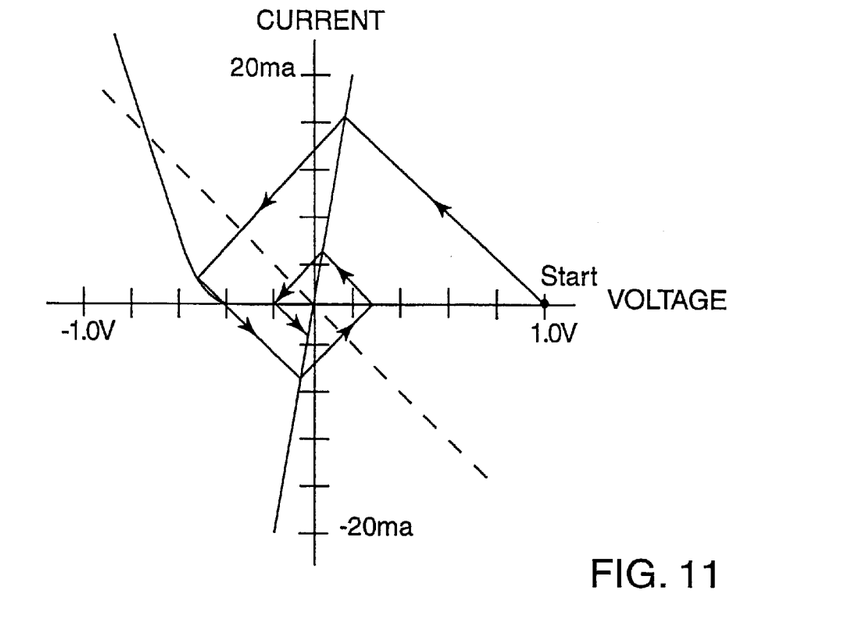
FIG. 11 is a voltage-current diagram showing the response of the transmission system when the operating voltage is dropped to about 1 volt to facilitate discussion of the reflection problems.

FIG. 11 demonstrates the point. In this case the operating voltage has been dropped to 1 volt (3 volt operation is about the crossover point for the effectiveness of Schottky diodes). In this case, the equilibrium point at the receiving end of the transmission line occurs in the high equivalent impedance region of the diode, leading to a proportionately high level of reflection back down the transmission line. Such a situation could be catastrophic, as shown. Because the diode impedance is so high in the low voltage region, the reflection problems are proportionately higher than they were back in the days of TTL circuits before the introduction of clamping diodes.

Because of the reflection problems associated with diode-based solutions, particularly at lower voltages, designers are now moving toward resistor terminated systems again. But this comes at the expense of a lot of power dissipation, which is particularly important in portable or other small systems. Getting precise termination is also difficult to engineer at the board level, especially in situations where the bus lines in question might involve sockets with varying numbers of loads which change the effective impedance.

Figure 12:
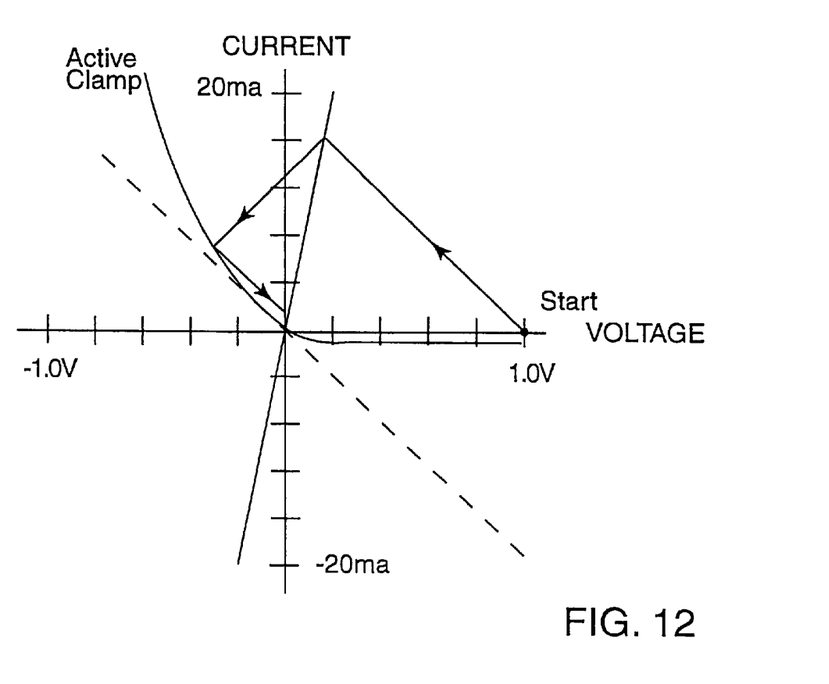
FIG. 12 is a voltage-current diagram showing the response of the transmission system when a "Zero Threshold" transistor or one having a slightly negative threshold is employed for termination.
Figure 13:
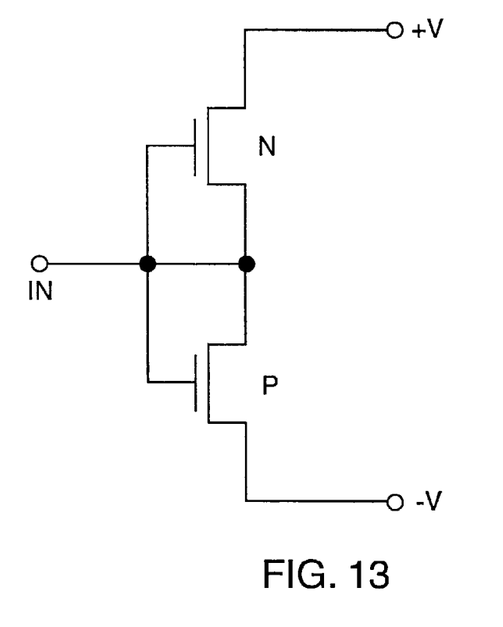
FIG. 13 depicts, in a generalized manner, a termination device wherein a "Zero Threshold" transistor or one having a slightly negative threshold is employed for termination.

FIG. 12 demonstrates a new kind of termination which has the low power benefits of the diode termination and still works at low voltages. In it, a "Zero Threshold" transistor, or more likely even one with a slightly negative threshold is used for termination. See FIG. 13 for the diagram. Within the active region of bus operation, these devices may be somewhat conductive, perhaps as much as 1 or 2 ma. However, compared to the 20 ma. or more of current that a terminating resistor would normally consume in this example, this is extremely low. As soon as the transmission line voltage reflects outside of the operating range, however, the zero threshold device turns on and provides a much softer turn-on.

Such systems save a lot of power. Further, they could eventually be integrated into the ICs themselves with, in some cases, two additional implants and masking steps. Additionally, diode terminations are extremely useful in applications such as memory buses where a variable number of cards might be inserted onto the memory bus. It is very difficult to determine the correct termination impedance in such applications and the diode class of solution is essentially self tuning. If other receiving devices do more clamping/terminating, the diode comes into play less. It is also less sensitive to the exact characteristic impedance of the transmission line. Further, freed from the necessity to terminate in a power consuming resistor network, chip designers can use smaller drive circuits because of reduced load, and use full rail voltage swings to get greater inherent noise margins.

The one negative of the diode type of termination is that it is an "nT" class of terminator, where n is the number of bus transition required before the bus is sufficiently stable for further action to proceed. A parallel termination is a 1T type of terminator in that all points of the transmission line are terminated correctly and no reflections are allowed. A series termination is a 2T terminator in that it relies on a half height wave propagating down a transmission line, being doubled, and then reflecting back to the source end to compete the setting. In both cases that is the theory, but usually impreciseness in the termination requires more settling than this.

To a first order approximation, the diode is a 3+T terminator which requires a waveform to propagate down the transmission line, be reflected back to the source, and then be subsequently reflected back to the receiving end before the bus is effectively settled. So in situations where the operating frequency of the bus is high relative compared to the length of the bus, the bus may not be fully settled when the next transition occurs. Under such circumstances, the line voltage could be slightly different from transition to transition giving rise to apparent edge jitter in the signal. This occurs because the output may have a little more or less voltage to transition from one cycle to another. While in today's systems with fast rise and fall times, this is probably not more than a couple tenths of a nanosecond, it is something that must be considered in any case.

One advantageous application for this terminator may be found on memory buses such as those used on the SDRAM, where the loading characteristics vary depending on the number of devices inserted, and where the voltage swings are likely to be high for the standard parts. However, if bus lengths are not too long relative to the operating frequency and edge jitter is not important, it would be applicable in almost any sort of system.

However, there is a problem in implementation. If the threshold of the "zero threshold" device is very close to zero volts, there is less of a concern. However, the region of concern is in the area 0V to 3 Volts. The normal variation of threshold in a CMOS process can be +/−0.2V. The implication is that depending on process variation, the diode can be anywhere from non-conducting to heavy conduction within the operating range. This would be unacceptable in many applications.

Figure 14:
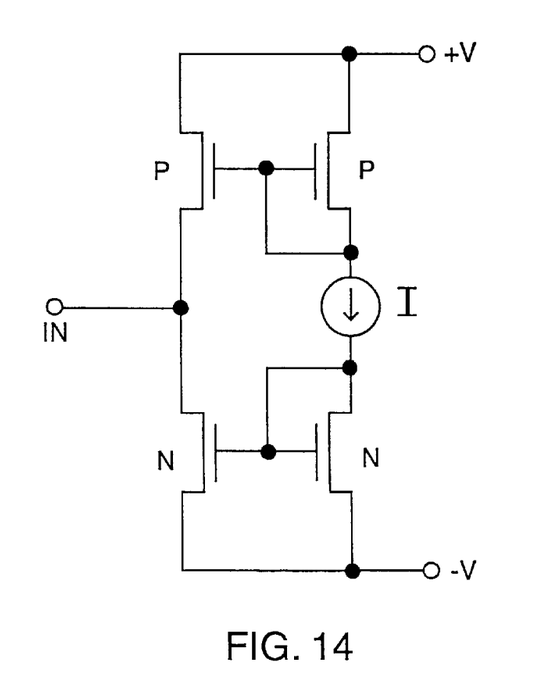
FIG. 14 illustrates, in accordance with one embodiment of the present invention, an improved termination circuit.

FIG. 14 shows a circuit solution to this problem. In this case, the gate of the clamping transistors is not connected to the power supply rail, but rather to a reference voltage which is designed to track the variations in threshold voltage. So if the threshold voltage is on the high side, the gate node is biased higher. If the threshold voltage is lower, the gate is biased lower. As a result, when voltage on the clamp reaches one of the rail voltages, the transistor is properly biased to provide the proper impedance characteristics and behaves like a zero threshold device. There will be some conduction through the clamping transistors, but as discussed before, this will be very small compared to the current which would be utilized if a resistor termination were used.

Figure 15:
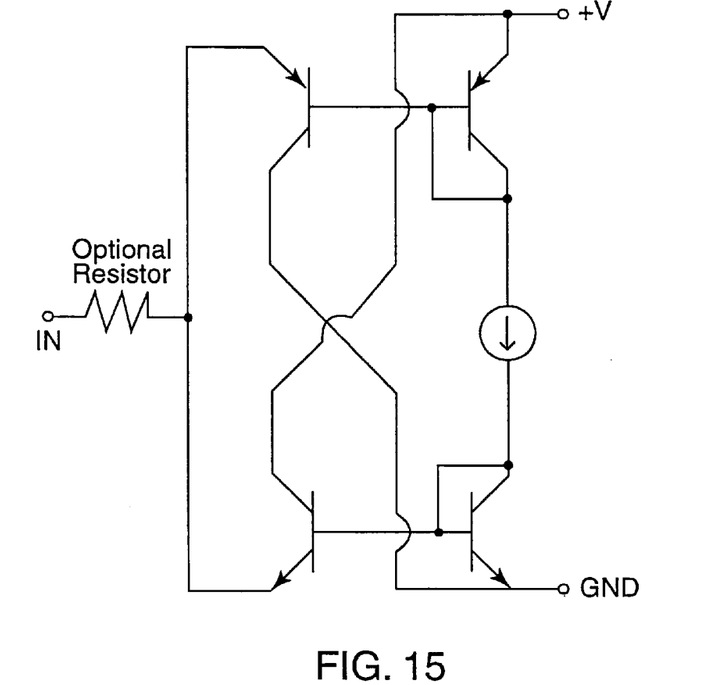
FIG. 15 illustrates, in accordance with still one embodiment of the present invention, an improved termination circuit which improves the settling time.

FIG. 15 illustrates a bipolar bipolar implementation of the inventive termination circuit. In FIG. 15, the clamping transistor is biased so that it will be non-conducting in the normal active range of the bus, but provides a clamping action outside of the power supply range. In some cases, the bipolar circuit may have an even lower effective impedance than the MOS devices.

This could be utilized in either of two ways. First, for some applications, the lower clamp voltage might be desirable. But, in other cases, it might be desirable to include the optional series resistor shown in FIG. 15 to provide an impedance which more readily settles the transmission line. When used with low voltage systems (2.5V or less), the initial undershoot voltage may be on the order of −0.75 Volts. Such a magnitude of voltage would not significantly forward bias the substrate diode of the receiving device which, if it happened, would cause stored charge problems. With the resistor the line would then settle almost immediately. For lower supply voltages, there would be no concern about the magnitude of undershoot. The bipolar system might be suitable for such a system. This bipolar system also has the advantage in that there would be no bias current through the output devices when the operating level of the transmission line is inside the limits of the power supply.

Finally, there is an exact equivalent of the bipolar circuit which could be made using CMOS technology. For inclusion of the clamp on an integrated circuit this would be a suitable alternative, and would likely closely approach the performance of the bipolar device. It also would have substantially no current drain within the operating range.

There are two potential advantageous applications of these clamps. One is as a separate device (e.g., a discrete Quarter Size Small Outline Package, or QSOP, device) for use in systems where the original devices do not already have such clamping circuits. Alternatively, one would expect this class of clamps to be added to every CMOS integrated circuit manufactured.

Figure 16:
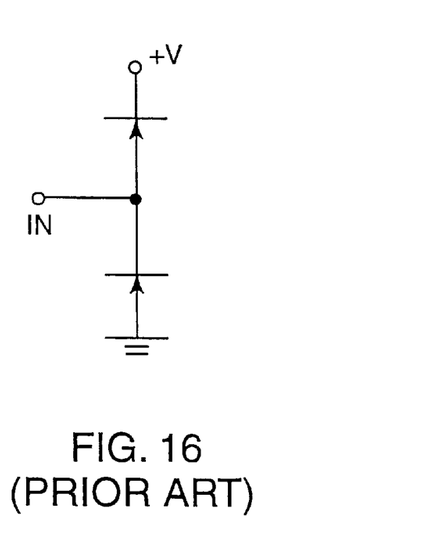
FIGS. 16 and 17 illustrate two prior art termination techniques.

The features and advantages of the invention may be appreciated by comparison with prior art approaches discussed below. FIG. 16 shows one prior art approach wherein a pair of diodes is employed to provide positive and negative clamping. High speed diodes may be helpful in avoiding stored charge problems, and in the early days of TTL this was achieved by providing gold doping to kill the lifetime of carriers in the device. Only the lower diode was typically used. Later this function was provided by Schottky diodes which have no minority carriers to create stored charge. Still later, Schottky diode networks external to the integrated circuits were offered as products with both the positive and negative clamp diodes. However, the high forward drop voltage of the diodes render this approach unsuitable for use with modern low voltage signals (since clamping will not take place until the signal exceeds the rail voltage by the forward drop voltage).

Figure 17:
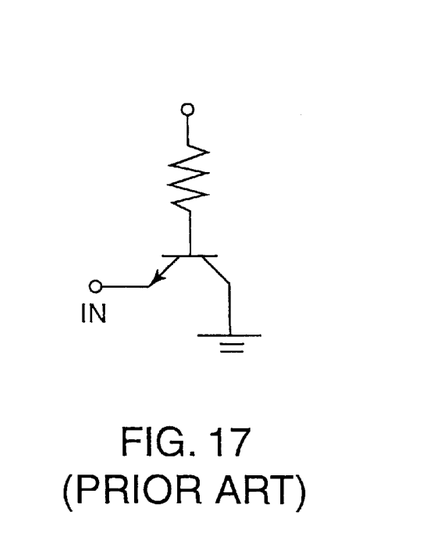

FIG. 17 shows a prior art clamp using a transistor. In order to function properly, it requires a high forward gains, an extremely low reverse gain, and a transistor offset which is low relative to the voltages being used. The function was performed by a gold doped device specially designed for low reverse gain. There were constant problems in balancing the characteristics necessary for proper functioning, but it was accomplished, albeit with difficulty. Further, this circuit does not have a practical equivalent for clamping to the positive rail. Additionally, neither of the circuits of FIGS. 16 or 17 has a practical equivalent of implementation for use in CMOS circuits.

While this invention has been described in terms of several preferred embodiments, there are alterations, permutations, and equivalents which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. An active termination circuit for terminating a signal traversing on a transmission line of a memory bus including a plurality of memory devices, the active termination circuit comprising:

a bottom clamping transistor having a node coupled to the transmission line, a node coupled to ground, and a gate; and a bottom threshold reference transistor having a first threshold voltage for clamping said signal at about ground, said bottom threshold reference transistor coupled to said gate of said bottom clamping transistor for biasing said gate of said bottom clamping transistor at about said first threshold voltage, said bottom clamping transistor being arranged for clamping said signal at about ground, whereby when the potential difference between the gate and the node coupled to the transmission line exceeds the first threshold voltage, the bottom clamping transistor begins to conduct current, thereby clamping the signal;

a top clamping transistor having a node coupled to $V_{DD}$, a node couple to the transmission line, and a gate; and a top threshold reference transistor having a second threshold voltage for clamping said signal at about $V_{DD}$, said top threshold reference transistor to said gate of said top clamping transistor for biasing said gate of said top clamping transistor at about said second threshold voltage, said top clamping transistor being arranged for clamping said signal at about said $V_{DD}$, whereby when the potential difference between the gate and the node coupled to the transmission line exceeds the second threshold voltage, the top clamping transistor begins to conduct current, thereby clamping the signal, whereby the first threshold voltage is different than the second threshold voltage, and whereby the termination circuit facilitates progression of the signal in a continuous fashion through the plurality of memory devices including in the memory bus.

2. An active termination circuit for terminating a transmission line a memory bus including a plurality of memory devices, said active termination circuit being configured to clamp a voltage level on said transmission line to one of a first reference voltage level and a second reference voltage level, said active termination circuit comprising:

a first clamping transistor coupled to a transmission line terminal and a first terminal, said transmission line terminal being configured to be coupled to said transmission line in said electronic device, said first terminal being configured to be coupled to said first reference voltage level in said electronic device;

a second clamping transistor coupled to said transmission line terminal and a second terminal, said second terminal being configured to be coupled to said second reference voltage level in said electronic device;

a first threshold reference device coupled to said first clamping transistor, said first threshold reference device being configured to maintain a base of said first clamping transistor at about one threshold voltage below said second reference voltage level;

a second threshold reference device coupled to said second clamping transistor, said second threshold reference device being configured to maintain a base of said second clamping transistor at about one threshold voltage above said first reference voltage level;

wherein said first threshold reference device is a p-n-p transistor that is collector-to-base connected, an emitter of said first threshold reference device being coupled to said second terminal, and whereby the termination circuit facilitates progression of the signal in a continuous fashion through the plurality of memory devices including in the memory bus.

3. The active termination circuit of claim 2 wherein said second threshold reference device is an n-p-n transistor that is collector-to-base connected, an emitter of said first threshold reference device being coupled to said first terminal.

4. The active termination circuit of claim 3 wherein a base of said first threshold reference device is coupled to said base of said first clamping transistor and a base of said second threshold reference device is coupled to said base of said second clamping transistor.

5. The active termination circuit of claim 4 wherein said first reference voltage level is ground and said second reference voltage level is $V_{DD}$.

6. The active termination circuit of claim 5 further comprising a voltage stabilizing circuit coupled to at least one of said base of said first clamping transistor and said base of said second clamping-transistor, said voltage stabilizing circuit being configured to improve stabilization of a voltage level on said at least one of said base of said first clamping transistor and said base of said second clamping transistor when said voltage level on said transmission line varies.

7. The active termination circuit of claim 6 wherein said first reference voltage level is ground and said second reference voltage level is $V_{DD}$, said base of said first clamping transistor is maintained at about $V_{DD}-V_{BE}$ when installed in said electronic device, wherein $V_{BE}$ represents a base-to-emitter voltage of said first clamping transistor, said base of said second clamping transistor is maintained at about ground $+V_{BE}$ when installed in said electronic device, wherein $V_{BE}$ represents a base-to-emitter voltage of said second clamping transistor.

8. A method for clamping a voltage level on a transmission line of a memory bus, including a plurality of memory devices, to one of a first reference voltage level and a second reference voltage level, comprising:

forming a clamping circuit, including, coupling a first clamping transistor to a transmission line terminal and a first terminal, said transmission line terminal being configured to be coupled to said transmission line in said electronic device, said first terminal being configured to be coupled to said first reference voltage level in said electronic device;

coupling a second clamping transistor to said transmission line terminal and a second terminal, said second terminal being configured to be coupled to said second reference voltage level in said electronic device;

coupling a first threshold reference device to said first clamping transistor, said first threshold reference device being configured to maintain a base of said first clamping transistor at about one threshold voltage below said second reference voltage level;

coupling a second threshold reference device to said second clamping transistor, said second threshold reference device being configured to maintain a base of said second clamping transistor at about one threshold voltage above said first reference voltage level;

wherein said first threshold reference device is a p-n-p transistor that is collector-to-base connected, an emitter of said first threshold reference device being coupled to said second terminal, and whereby the termination circuit facilitates progression of the signal in a continuous fashion through the plurality of memory devices including in the memory bus.

9. The method of claim 8 wherein said second threshold reference device is an n-p-n transistor that is collector-tobase connected, an emitter of said first threshold reference device being coupled to said first terminal.

10. The method of claim 9 wherein a base of said first threshold reference device is coupled to said base of said first clamping transistor and a base of said second threshold reference device is coupled to said base of said second clamping transistor.

11. A method for clamping a voltage level on a transmission line of a memory bus, which includes a plurality of memory devices, to one of a first reference voltage level and a second reference voltage level, comprising:

coupling a first clamping transistor to a transmission line terminal and a first terminal, said transmission line terminal being configured to be coupled to said transmission line in said electronic device, said first terminal being configured to be coupled to said first reference voltage level in said electronic device;

coupling a second clamping transistor to said transmission line terminal and a second terminal, said second terminal being configured to be coupled to said second reference voltage level in said electronic device;

coupling a first threshold reference device to said first clamping transistor, said first threshold reference device permitting said first clamping transistor to function as a first substantially zero-threshold diode to clamp said voltage level on said transmission line to said second reference voltage when said voltage level on said transmission line attempts to vary outside of said second reference voltage level; and coupling a second threshold reference device to said second clamping transistor, said second threshold reference device permitting said second clamping transistor to function as a second substantially zero-threshold diode to clamp said voltage level on said transmission line to said first reference voltage when said voltage level on said transmission line attempts to vary outside of said first reference voltage level;

wherein said first threshold reference device is a p-n-p transistor that is collector-to-base connected, an emitter of said first threshold reference device being coupled to said second terminal, and whereby the termination circuit facilitates progression of the signal in a continuous fashion through the plurality of memory devices including in the memory bus.

12. The method of claim 11 wherein said second threshold reference device is an n-p-n transistor that is collector-to-base connected, an emitter of said first threshold reference device being coupled to said first terminal.

13. The method of claim 12 wherein a base of said first threshold reference device is coupled to said base of said first clamping transistor and a base of said second threshold reference device is coupled to said base of said second clamping transistor.

14. The active termination circuit of claim 2 further comprising a voltage stabilizing circuit coupled to at least one of said base of said first clamping transistor and said base of said second clamping transistor, said voltage stabilizing circuit being configured to improve stabilization of a voltage level on said at least one of said base of said first clamping transistor and said base of said second clamping transistor when said voltage level on said transmission line varies.

15. The method of claim 8 wherein said first reference voltage level is ground and said second reference voltage level is $V_{DD}$.

16. The method of claim 11 wherein said first reference voltage level is ground and said second reference voltage level is $V_{DD}$.

* * * * *